United States Patent
Lyle et al.

(10) Patent No.: US 10,210,259 B2
(45) Date of Patent: Feb. 19, 2019

(54) CONTRIBUTOR CHARACTERISTIC BASED TAG CLOUDS

(75) Inventors: Ruthie D. Lyle, Durham, NC (US); Arthur R. Francis, Raleigh, NC (US); Veronique L. Moses, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 11/950,058

(22) Filed: Dec. 4, 2007

(65) Prior Publication Data
US 2009/0144297 A1 Jun. 4, 2009

(51) Int. Cl.
*G06F 17/30* (2006.01)

(52) U.S. Cl.
CPC .. *G06F 17/30867* (2013.01); *G06F 17/30884* (2013.01)

(58) Field of Classification Search
CPC ............... G06F 17/30867; G06F 17/30884
See application file for complete search history.

(56) References Cited

U.S. PATENT DOCUMENTS

| | | | | |
|---|---|---|---|---|
| 7,734,641 B2* | 6/2010 | Kanigsberg et al. | ......... | 707/765 |
| 8,126,767 B1* | 2/2012 | Aldridge | ................ | G06Q 10/04 705/7.36 |
| 2002/0010707 A1 | 1/2002 | Chang et al. | | |
| 2005/0289459 A1* | 12/2005 | Walton | .......... | 715/526 |
| 2006/0195442 A1 | 8/2006 | Cone et al. | | |
| 2006/0200435 A1* | 9/2006 | Flinn et al. | ..................... | 706/12 |
| 2006/0242178 A1 | 10/2006 | Butterfield et al. | | |
| 2008/0086471 A1* | 4/2008 | Ritter et al. | ...................... | 707/8 |
| 2008/0209340 A1* | 8/2008 | Tonse et al. | ................... | 715/745 |
| 2008/0209349 A1* | 8/2008 | Macadaan et al. | ........... | 715/762 |
| 2008/0282198 A1* | 11/2008 | Brooks et al. | ................ | 715/854 |
| 2008/0294621 A1* | 11/2008 | Kanigsberg et al. | ............. | 707/5 |
| 2008/0294624 A1* | 11/2008 | Kanigsberg et al. | ............. | 707/5 |
| 2009/0006442 A1* | 1/2009 | Anderson et al. | ............ | 707/102 |
| 2009/0070852 A1* | 3/2009 | Chijiiwa et al. | .................. | 726/1 |
| 2009/0094190 A1* | 4/2009 | Stephens | ................ | G06Q 10/10 |
| 2010/0223157 A1* | 9/2010 | Kalsi | ...................... | G06Q 30/06 705/26.1 |

* cited by examiner

*Primary Examiner* — Taelor Kim
(74) *Attorney, Agent, or Firm* — Steven M. Greenberg, Esq.; Shutts & Bowen LLP

(57) ABSTRACT

Embodiments of the present invention address deficiencies of the art in respect to the visual display of tags and provide a method, system and computer program product for contributor characteristic based tag clouds. In an embodiment of the invention, a tag cloud generation method can include loading tags for resources in a social bookmarking system, determining a personal characteristic for each of the end users applying the tags to the resources, and rendering a tag cloud for the tags based upon the personal characteristic of the end users and not based upon the frequency of use of the tags alone.

18 Claims, 1 Drawing Sheet

CONTRIBUTOR CHARACTERISTIC BASED TAG CLOUDS

BACKGROUND OF THE INVENTION

Field of the Invention

The present invention relates to the field of social networking and more particularly to social bookmarking content.

Description of the Related Art

Content browsing refers to the retrieval and presentation of electronic content in a browser client. Content generally can include electronic documents, messages, audio, audio-visual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material. In other cases the content can be a physical object, like a book, and content browsing can retrieve the physical location of the book, for example in a library or other information associated with the object.

Given the vast amount of content published for accessibility over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In operation, in a social bookmarking system, users save links to memorable content. Unlike traditional bookmarks; however, in a social bookmarking system the links subsequently can be published for public inspection and use, so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information rather than merely storing bookmarks in a traditional file hierarchy. One such type of meta-information is a simple descriptive text label referred to in the art as a "tag". As such, users processing annotations for a social bookmark can view the social bookmark for content along with meta-information pertaining to the bookmark, for instance the number of users having bookmarked the content. Further, some social bookmarking services infer clusters of bookmarks from the relationship of corresponding annotations. Finally, many social bookmarking services provide subscription based feeds for lists of bookmarks, including lists organized by annotations. Consequently, subscribers can become aware of new bookmarks as the bookmarks are saved, shared, and annotated by other users.

The visual display of social bookmarks can be reflected in the display of the tags used within the social bookmarking site. The visual display of the tags can vary according to the number of users in a social network who have bookmarked the corresponding content with that same tag. In particular, tag clouds often include tags with a font size commensurate with a number of users in the social network whom have bookmarked the corresponding content with that same tag. In this way, a visual glance of the content will indicate which aspects of the content are most interesting to the social network at large as the font size of the different words in the content will vary relative to the other words according to the popularity of the different words.

BRIEF SUMMARY OF THE INVENTION

Embodiments of the present invention address deficiencies of the art in respect to the visual display of tags and provide a novel and non-obvious method, system and computer program product for contributor characteristic based tag clouds. In an embodiment of the invention, a tag cloud generation method can include loading tags for resources in a social bookmarking system, determining a personal characteristic for each of the end users applying the tags to the resources, and rendering a tag cloud for the tags based upon the personal characteristic of the end users and not based upon the frequency of use of the tags alone.

In one aspect of the embodiment, determining a personal characteristic for each of the tags for each of the end users applying the tags to the resources can include determining a geographic location for each of the end users applying the tags to the resources. In another aspect of the embodiment, determining a personal characteristic for each of the tags for each of the end users applying the tags to the resources can include determining an age for each of the end users applying the tags to the resources. In yet another aspect of the embodiment, determining a personal characteristic for each of the tags for each of the end users applying the tags to the resources can include determining a gender for each of the end users applying the tags to the resources.

In another embodiment of the invention, a social bookmarking data processing system can be provided. The system can include a social bookmarking system coupled to a data store of tags. The system further can include contributor characteristic logic. The logic can include program code enabled to collect personal characteristics for end users applying the tags to resources and to render a tag cloud for the tags based upon the personal characteristics of the end users and not based upon the frequency of use of the tags alone. In one aspect of the embodiment, the personal characteristics can include characteristics such as location, age and gender Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for contributor characteristic based tag clouds in a social bookmarking system. In accordance with an embodiment of the present invention, tags can be applied to resources by end users of a social bookmarking system. Each of the tags can be stored in the social bookmarking system along with at least one personal characteristic of the end users. Subsequently, a tag cloud can be rendered for the tags not based on a frequency of use of the tags, but based upon the personal characteristic of the end users, for example the different geographic locations of the end users, the age of the end users or the gender of the end users, to name only a few personal characteristics.

Figure 1:
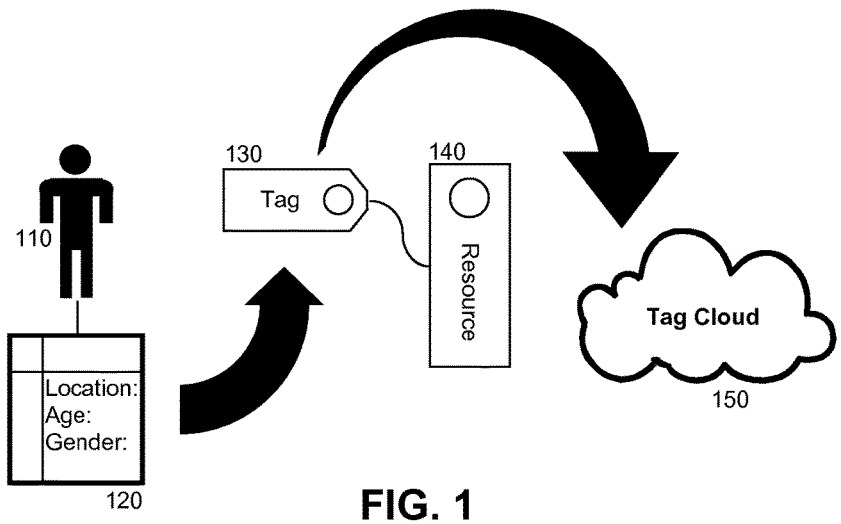
FIG. 1 is a pictorial illustration of a process for managing contributor characteristic based tag clouds.

In further illustration, FIG. 1 is a pictorial illustration of a process for managing contributor characteristic based tag clouds. As shown in FIG. 1, an end user 110 can apply a tag 130 to a resource 140 in a social bookmarking system. As the end user 110 applies the tag 130 to the resource 140, one or more personal characteristics 120 of the end user 110 can be stored in association with the tag 130. Exemplary personal characteristics 120 include the geographic location of the end user 110, an age of the end user 110, and a gender of the end user 110. Thereafter, a tag cloud 150 can be rendered, either visually or audibly, accounting for the personal characteristics 120 of the end user 110 rather than a frequency of use of the tag 130 when determining how to visually distinguish the tag 130 in the tag cloud 150.

Figure 2:
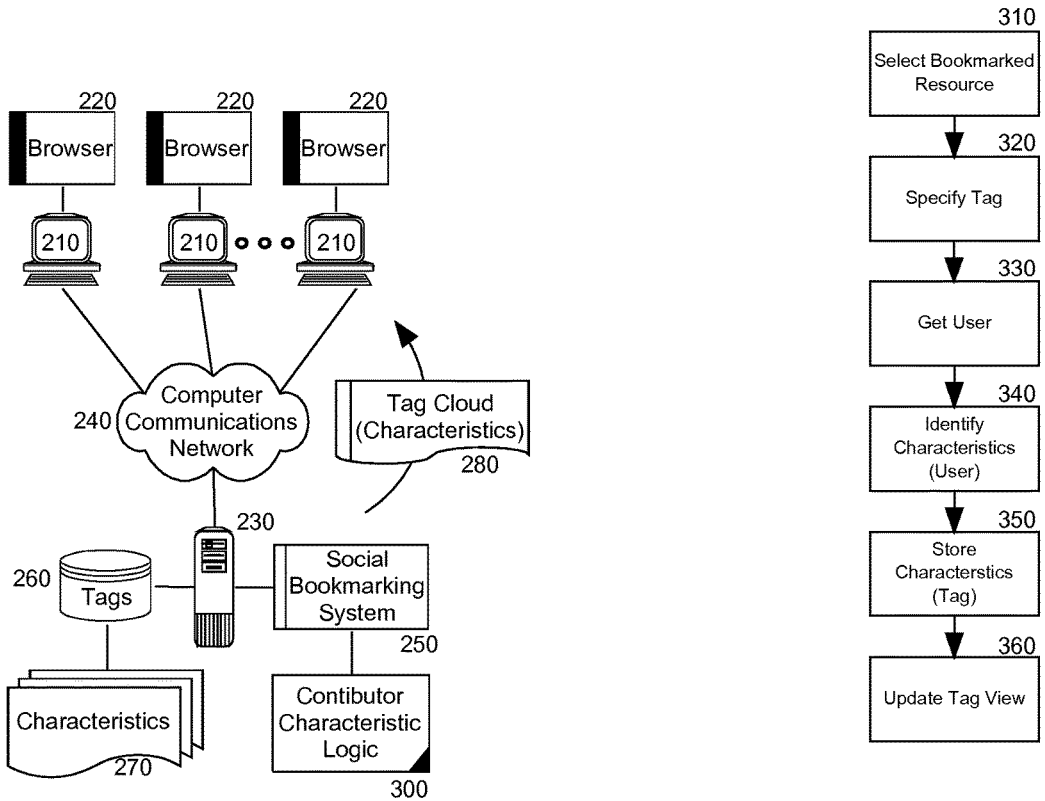
FIG. 2 is a schematic illustration of a social bookmarking data process system configured for contributor characteristic based tag clouds; and, FIG. 3 is a flow chart illustrating a process for contributor characteristic based tag clouds

The process shown in FIG. 1 can be implemented with a social bookmarking data processing system. In this regard, FIG. 2 is a schematic illustration of a social bookmarking data process system configured for contributor characteristic based tag clouds. The system can include a host server 230 supporting the operation of a social bookmarking system 250 in which different tags 260 can be stored in connection with different resources. The host server 230 can be configured for communicative coupling to multiple different computing clients 210 over computer communications network 240. Each of the computing clients 210 in turn can support the operation of a content browser 220 enabled to present content with links to resources.

Notably, the social bookmarking system 250 can include contributor characteristic logic 300. The contributor characteristic logic 300 can include program code enabled to collect and store personal characteristics 270 for end users in connection with tags 260 applied to the resources. The personal characteristics 270 can include, by way of example, a geographic location of the end user, an age for the end user or a gender for the end user. Consequently, the program code of the contributor characteristic logic 300 can be enabled to generate and forward a tag cloud 280 over the computer communications network 240 for display in the content browsers 220, not based upon the frequency of tagging alone, but also one or more of the personal characteristics 270, or in the alternative, based upon one or more of the personal characteristics 270 alone.

In this regard, the tag cloud 280 can be constructed according to just a single one of the personal characteristics 270, or a combination, weighted or otherwise, of the personal characteristics 270. Further, the frequency of use of a given one of the tags 260 in the tag cloud 280 can be accounted for in combination with the personal characteristics 270, or the frequency of use of a given one of the tags 260 can be excluded from consideration. Yet further, the applicability of the personal characteristics 270 can be filtered according to user preference such as limiting the number and types of personal characteristics 270 to be applied. Likewise, the applicability of the personal characteristics 270 can be date limited to a range of dates when the personal characteristics 270 had been collected by the social bookmarking system 250.

In any case, placing a cursor in proximity to the tag cloud 280 can result in the personal characteristics 270 of an end user or all contributing end users being revealed. Additionally, when showing a tag cloud 280 constructed according to the personal characteristics 270, the personal characteristics 270 applied can be indicated within the user interface.

Figure 3:
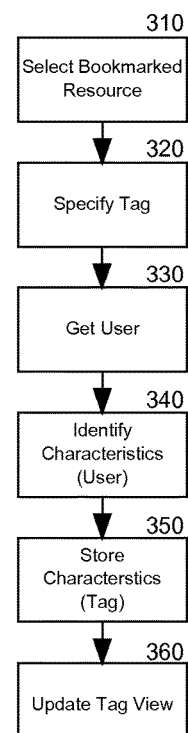

In even yet further illustration, FIG. 3 is a flow chart illustrating a process for contributor characteristic based tag clouds. Beginning in block 310, a bookmarked resource can be selected for process and in block 320, a tag can be specified for the resource. In block 330 a user applying the tag can be identified and in block 340, one or more personal characteristics of the user can be determined. Thereafter, in block 350 the personal characteristics of the identified user can be stored in connection with the applied tag and in block 360, a tag cloud incorporating the applied tag and based upon the personal characteristics of end users applying the tag can be updated to reflect the personal characteristics of the identified user.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A tag cloud generation method comprising:
 collecting and storing personal characteristics by different end users applying different tags to different resources in a social bookmarking system executing in memory of a computer, determining a date when the characteristics are collected and stored and storing each determined date in connection with a corresponding one of the collected and stored personal characteristics; and,
 subsequent to the collecting and storing of the personal characteristics by the different end users applying the different tags to the different resources in the social bookmarking system performing:
  selecting a bookmarked one of the different resources for tagging in the social bookmarking system;
  identifying an end user performing the selection;
  receiving a tag in the social bookmarking system specified by the end user and describing the selected bookmarked resource;
  applying the tag to the selected bookmarked resource;
  determining a personal characteristic of the end user applying the tag;
  retrieving both other tags applied by at least one other end user to the selected bookmarked resource that describe the selected bookmarked resource, and also a personal characteristic for the at least one other end user who applied one of the other tags to the selected bookmarked resource;
  filtering the personal characteristics collected and stored prior to the selecting of the bookmarked one of the different resources according to a date limitation corresponding to when each of the collected and stored personal characteristics had been collected and stored by the social bookmarking system indicated by each date stored in correspondence to the collected and stored personal characteristics; and,
  rendering a tag cloud for the tags, each one of the tags in the tag cloud being visually distinguished from one another by at least one display characteristic chosen to correspond both to a frequency of tagging and also at least in based part upon one of the filtered personal characteristics.

2. The method of claim 1, wherein determining a personal characteristic, comprises determining a geographic location for the end user.

3. The method of claim 1, wherein determining a personal characteristic, comprises determining an age for the end user.

4. The method of claim 1, wherein determining a personal characteristic, comprises determining a gender for the end user.

5. The method of claim 1, wherein rendering a tag cloud for the tags, comprises rendering a tag cloud for the tags based upon the personal characteristic of the end users in combination with the frequency of use of the tags.

6. The method of claim 1, wherein the at least one display characteristic is chosen to correspond at least in part upon a personal characteristic identified with a specified data range of an end user who applied a corresponding one of the tags.

7. The method of claim 1, further comprising:
 detecting a proximity of a cursor to the tag cloud; and,
 displaying the personal characteristic in association with the tag cloud in response to detecting the proximity of the cursor to the tag cloud.

8. The method of claim 1, further comprising:
 determining additional personal characteristics for each of the end users applying the tags to the resources;
 filtering out different ones of the additional personal characteristics; and,
 rendering the tag cloud for the tags based upon remaining ones of the additional personal characteristics of the end users.

9. A social bookmarking data processing system comprising:
 at least one computer with memory and at least one processor;
 a social bookmarking system executing in the memory by at least one processor of the at least one computer, the system being coupled to a data store of tags; and,
 contributor characteristic logic comprising program code enabled to collect and store personal characteristics by different end users applying different tags to different resources in the social bookmarking system, determining a date when the characteristics are collected and stored and storing each determined date in connection with a corresponding one of the collected and stored personal characteristics, and subsequent to the collecting and storing of the personal characteristics by the different end users applying the different tags to the different resources in the social bookmarking system performing:
  selecting a bookmarked one of the different resources for tagging in the social bookmarking system for tagging,
  identifying an end user performing the selection,
  receiving a tag in the social bookmarking system specified by the end user and describing the selected bookmarked resource,
  applying the tag to the selected bookmarked resource,
  determining a personal characteristic of the end user applying the tag,
  retrieving both other tags applied by at least one other end user to the selected bookmarked resource that describe the selected bookmarked resource, and also a personal characteristic for the at least one other end user who applied one of the other tags to the selected bookmarked resource,
  filtering the personal characteristics collected and stored prior to the selecting of the bookmarked one of the different resources according to a date limitation corresponding to when each of the collected and stored personal characteristics had been collected and stored by the social bookmarking system indicated by each date stored in correspondence to the collected and stored personal characteristics, and
  rendering a tag cloud for the tags, each one of the tags in the tag cloud being visually distinguished from one another by at least one display characteristic chosen to correspond both to a frequency of tagging and also at least in based part upon one of the filtered personal characteristics.

10. The system of claim 9, wherein the personal characteristics comprise characteristics selected from the group consisting of location, age and gender.

11. A computer program product comprising a non-transitory computer usable medium embodying computer usable program code for tag cloud generation, the computer program code performing:

collecting and storing personal characteristics by different end users applying different tags to different resources in a social bookmarking system executing in memory of a computer, determining a date when the characteristics are collected and stored and storing each determined date in connection with a corresponding one of the collected and stored personal characteristics; and subsequent to the collecting and storing of the personal characteristics by the different end users applying the different tags to the different resources in the social bookmarking system performing:

selecting a bookmarked one of the different resources for tagging in the social bookmarking system;

identifying an end user performing the selection;

receiving a tag in the social bookmarking system specified by the end user and describing the selected bookmarked resource;

applying the tag to the selected bookmarked resource;

determining a personal characteristic of the end user applying the tag;

retrieving both other tags applied by at least one other end user to the selected bookmarked resource that describe the selected bookmarked resource, and also a personal characteristic for the at least one other end user who applied one of the other tags to the selected bookmarked resource;

filtering the personal characteristics collected and stored prior to the selecting of the bookmarked one of the different resources according to a date limitation corresponding to when each of the collected and stored personal characteristics had been collected and stored by the social bookmarking system indicated by each date stored in correspondence to the collected and stored personal characteristics; and, rendering a tag cloud for the tags, each one of the tags in the tag cloud being visually distinguished from one another by at least one display characteristic that had been chosen to correspond both to a frequency of tagging and also at least in based part upon one of the filtered personal characteristics.

12. The computer program product of claim 11, wherein the determining a personal characteristic, comprises determining a geographic location for the end user.

13. The computer program product of claim 11, wherein the determining a personal characteristic, comprises determining an age for the end user.

14. The computer program product of claim 11, wherein the determining a personal characteristic, comprises determining a gender for the end user.

15. The computer program product of claim 11, wherein the rendering a tag cloud for the tags, comprises rendering a tag cloud for the tags based upon the personal characteristic of the end users in combination with the frequency of use of the tags.

16. The computer program product of claim 11, wherein the at least one display characteristic is chosen to correspond at least in part upon a personal characteristic identified with a specified data range of an end user who applied a corresponding one of the tags.

17. The computer program product of claim 11, wherein the computer program code further performs:

detecting a proximity of a cursor to the tag cloud; and, displaying the personal characteristic in association with the tag cloud in response to detecting the proximity of the cursor to the tag cloud.

18. The computer program product of claim 11, wherein the computer program code further performs:

determining additional personal characteristics for each of the end users applying the tags to the resources;

filtering out different ones of the additional personal characteristics; and, rendering the tag cloud for the tags based upon remaining ones of the additional personal characteristics of the end users.

* * * * *